(12) United States Patent
Schuster et al.

(10) Patent No.: US 12,522,374 B2
(45) Date of Patent: Jan. 13, 2026

(54) COUPLING MODULE AS AN INTERFACE BETWEEN A PASSENGER BOARDING BRIDGE OR STAIRCASE AND THE FUSELAGE OF AN AIRCRAFT

(71) Applicant: HÜBNER GmbH & Co. KG, Kassel (DE)

(72) Inventors: Heinz Schuster, Kassel (DE); Sebastian Schmelz, Niestetal (DE)

(73) Assignee: HÜBNER GmbH & Co. KG, Kassel (DE)

( * ) Notice: Subject to any disclaimer, the term of this patent is extended or adjusted under 35 U.S.C. 154(b) by 770 days.

(21) Appl. No.: 17/817,059

(22) Filed: Aug. 3, 2022

(65) Prior Publication Data
US 2023/0040399 A1    Feb. 9, 2023

(30) Foreign Application Priority Data
Aug. 4, 2021 (EP) .................................... 21189649

(51) Int. Cl.
*B64F 1/305* (2006.01)
(52) U.S. Cl.
CPC ................................ *B64F 1/3055* (2013.01)
(58) Field of Classification Search
CPC ..................................................... B64F 1/3055
USPC ......................................................... 14/71.5
See application file for complete search history.

(56) References Cited

U.S. PATENT DOCUMENTS

| | | | | |
|---|---|---|---|---|
| 3,641,604 A | * | 2/1972 | Eggert, Jr. ............ | B64F 1/3055 14/71.5 |
| 4,318,198 A | * | 3/1982 | Drozd .................. | B64F 1/3055 14/71.5 |
| 4,553,720 A | * | 11/1985 | Harder .................. | B64F 1/3055 14/71.5 |
| 6,122,789 A | * | 9/2000 | Stephenson ........... | B64F 1/3055 14/71.1 |
| 6,543,076 B1 | | 4/2003 | Worpenberg et al. | |
| 7,900,307 B2 | * | 3/2011 | Okahira ................. | B64F 1/305 14/71.3 |
| 8,429,780 B2 | * | 4/2013 | Scharf .................... | B64F 1/3055 14/71.5 |
| 10,196,157 B2 | * | 2/2019 | Schuster ................. | E01D 18/00 |
| 10,207,821 B2 | * | 2/2019 | Schuster ............... | B64F 1/3055 |
| 2002/0100128 A1 | * | 8/2002 | Tholen .................. | B64F 1/3055 14/69.5 |
| 2003/0229955 A1 | * | 12/2003 | Savage ................. | B64F 1/3055 14/71.5 |

FOREIGN PATENT DOCUMENTS

| | | | | |
|---|---|---|---|---|
| EP | 1159195 B1 | 5/2003 | | |
| EP | 1727732 B1 | 5/2009 | | |
| WO | WO-9819910 A1 | * | 5/1998 | ............. B64F 1/305 |

* cited by examiner

*Primary Examiner* — Raymond W Addie
(74) *Attorney, Agent, or Firm* — Dinsmore & Shohl LLP (57) ABSTRACT

A coupling module as an interface between an air passenger bridge or staircase and the aircraft fuselage has a cabin and a walkable swivel floor. At least the swivel floor is pivotably arranged about a pivot axis at the cabin to align the swivel floor at a door opening in an aircraft fuselage. The swivel floor has at least one front floor segment travelable with respect to a base body of the swivel floor in the direction of the aircraft fuselage.

19 Claims, 6 Drawing Sheets

COUPLING MODULE AS AN INTERFACE BETWEEN A PASSENGER BOARDING BRIDGE OR STAIRCASE AND THE FUSELAGE OF AN AIRCRAFT

CROSS-REFERENCE TO RELATED APPLICATIONS

This application claims priority to European Patent Application 21189649.3 filed Aug. 4, 2021 which is hereby incorporated by reference in its entirety.

FIELD OF THE INVENTION

The invention relates to a coupling module as an interface between a passenger boarding bridge or staircase and the fuselage of an aircraft comprising a cabin and a walkable swivel floor arranged at the cabin, wherein at least the swivel floor is arranged pivotable about a pivot axis at the cabin to align the swivel floor at a door opening present in an aircraft fuselage.

BACKGROUND OF THE INVENTION

A coupling module as an interface between a passenger boarding bridge or staircase and the fuselage of an aircraft is known from EP 1 727 732 B1. A walkable floor that can be extended toward the aircraft fuselage is arranged at a cabin. The extendable floor can be tilted about a transverse axis of the coupling module to adapt the height of the front edge of the floor to the height of the door opening in the aircraft fuselage. The tilting of the swivel floor takes place here in a joint whose joint axis coincides with the transverse axis that extends in the width direction of the swivel floor and that thus extends approximately in parallel with a longitudinal axis of an aircraft parkable in front of the air passenger bridge. Lower edges of different heights of door openings to which the front side of the walkable floor has to be adapted can thus generally not be compensated since, on a change of the height of the lower edge of the door opening of different models of aircraft, a tiling of the walkable floor in a pivot axis has to take place that runs toward the parkable aircraft and that is thus perpendicular to the transverse axis and thus the joint axis.

EP 1 159 195 B1 discloses a coupling module as an interface between a passenger boarding bridge or staircase and the fuselage of an aircraft comprising a cabin and a walkable swivel floor, wherein the swivel floor is pivotable about a pivot axis that runs approximately horizontally toward the fuselage of the aircraft parkable in front of the coupling module. At the same time, the floor can be traveled in a transverse axis that is perpendicular to the pivot axis and that extends in the width direction of the swivel floor.

There is generally a demand on the coupling module as an interface between an air passenger bridge or staircase and the fuselage of an aircraft to provide a walkable floor that has an only minimal total depth in a resting position, for instance when the air passenger bridge is not used. The total depth of the air passenger bridge resulting toward the front in the direction of a parkable aircraft should, where possible, not exceed a specified specific depth, with simultaneously a minimum depth being necessary to be able to handle certain aircraft.

Coupling modules of air passenger bridges have floors that frequently have different depths in the pivot axis and the dimension between the bumper by which a direct contact with the aircraft fuselage can be established and a sliding gate or a bulkhead in the coupling module typically amounts to approximately 800 mm. New, larger aircraft, however, have aircraft doors that require a pivot range of more than 1000 mm so that a coupling module with a floor depth of 800 mm from the bumper to the sliding gate or bulkhead cannot be coupled to all aircraft models. The total depth of the coupling module should, however, not exceed a specific depth in the resting position of the air passenger bridge and predefined safety distances have to be observed.

SUMMARY OF THE INVENTION

The object of the invention is the further improvement of a coupling module having a swivel floor that is expanded in its functional extent such that a high adaptability of the coupling module to different models of aircraft is possible while the swivel floor, where possible, does not exceed a specific depth in the resting position of the aircraft bridge.

This object is achieved starting from a coupling module in accordance with the disclosure herein and starting from an air passenger bridge in accordance with the disclosure herein, by the respective characterizing features. Further measures improving the invention are also set forth.

The invention is based on the insight of configuring the swivel floor with at least one front floor segment configured as travelable and walkable in the direction of the aircraft fuselage.

The central idea of the invention is the further development of a coupling module having a swivel floor that is both pivotable about a pivot axis to adapt the swivel floor to door openings of different heights of different models of aircraft and to lengthen the swivel floor temporarily in the direction of a parking aircraft fuselage. In accordance with the invention, a front floor segment is provided that is extendable at the front side with respect to a base body of the existing swivel floor of the coupling module in the direction of the aircraft fuselage for this lengthening of the depth of the swivel floor. The base body here in particular forms a part of the walkable surface of the swivel floor.

The swivel floor here is arranged pivotable about a pivot axis at the cabin and extends substantially horizontally in the direction of a parking aircraft. The alignment of the pivot axis in particular extends perpendicular to the transverse extent of the swivel floor. The transverse extent here forms the width of the swivel floor that, while neglecting an angular position, extends in parallel with the longitudinal axis of the aircraft.

The extendibility can be implemented in various manners. The front floor segment can e.g. be able to be telescoped out of the swivel floor, that is it is in particular able to be telescopically extended from the walkable swivel floor to the front in the direction of the parkable aircraft. The front floor segment here does not have to be surrounded by the swivel floor over its full periphery so that the telescopic ability is also present when the major depth of the front floor segment can travel beneath the swivel floor. It is also possible that the front floor segment can travel into a recess, such as a pocket or a free space, that is introduced into the base body of the swivel floor and whose reception opening opens toward the aircraft fuselage, with the front floor segment being able to travel into the reception opening.

Further possibilities for implementing the extendibility are that the front floor segment can be pivoted or fanned out with respect to the base body.

In accordance with an embodiment, the front floor segment can be divided into at least two sections that are flexibly or movably connected to one another. A plurality of sections can also be provided that are movably, in particular rotatably, or flexibly connected to one another. The front floor segment can e.g. overall be manufactured from a flexible material so that it is deformable—viewed in the direction of extension—over its total length on a corresponding force application. It may, however, by all means be sufficient when—viewed in the direction of extension—two or three sections are provided that are flexibly or movably connected to one another. They can specifically be parts that are separate from one another and that are connected to one another by means of spring metal sheet or joints or hinges. An axis of rotation about which the sections are arranged rotatable relative to one another here preferably extends along a connection line between the respectively adjacent sections.

In the extended state, the first section and the second section (and optionally the further sections) have a first orientation with respect to one another. The sections can in particular form a planar level, i.e. the sections are arranged flush with one another. In the retracted state, the sections can in contrast have a second orientation different therefrom. The sections can in particular be inclined with respect to one another. The sections can specifically be arranged dipped obliquely downwardly beneath the base body in the retracted state. A front floor segment that is long in the direction of extension overall can thus also be retracted beneath the base body, even if the base body has a shorter length in the direction of extension than the front floor segment, or if the free space beneath the base body is limited toward the rear by other components.

In a further embodiment, a guide can be provided for a movement guidance of the different sections of the front floor segment that are movably or flexibly connected to one another. The guide can in particular be formed by the base body and specifically by the lower side of the base body. On the retraction movement, the sections of the front floor segment are accordingly suitably tilted with respect to one another by the guide so that the front floor segment dips beneath the base body in a space saving manner.

It is also of advantage if the front floor segment is configured such that it can travel out at different extension lengths over its width. The front floor segment here can also have a plurality of part segments configured next to one another or as fan-like in the width direction that can be extended or fanned out by different amounts to compensate a curvature of the aircraft fuselage. If the front floor segment is configured as a single part, it can also, for example, extend in a type of slanted position, in particular with a bumper arranged at the front side at the front floor segment providing a final remaining compensation that can be pressed in to different extents over the curvature of the aircraft fuselage.

Different drive possibilities are present to move the front floor segment with respect to the swivel floor. In addition to a conventional drive via a spindle and a threaded rod or via a pinion and rack drive, provision is advantageously made to design the drive such that the front floor segment does not cause any damage to the aircraft fuselage on unusually powerful movements of the air passenger bridge toward said aircraft fuselage. It is thus of advantage if the front floor segment so-to-say Is arranged as yieldingly resilient at the swivel floor so that a yielding capability is made possible in the front floor segment on a pressure load of the aircraft fuselage on the air passenger bridge.

To create a yielding capability of the front floor segment relative to the otherwise rigid swivel floor, at least one pressure element is advantageously provided by which the front floor segment has a force exerted on it in the extending direction with respect to the base body of the swivel floor. The pressure element or elements are configured to resiliently yield to a counterpressure notwithstanding the pressure element being located in a force flow between the swivel floor and the front floor segment and preloading the front flow segment in a yielding manner in the extending direction.

The pressure element can in particular be configured as a gas spring so that the movement of the front floor segment with respect to the base body of the swivel floor undergoes a damping in addition to the spring effect, with the pressure element also being able to be designed as a simple spring element in a simplified case.

At least one or more pulling means can furthermore be arranged by which a force can be applied to the front floor segment, with the one or more pulling means, for example, having a flat belt, a cable, in particular a wire cable, a strap, and/or a toothed belt. If a force is introduced into the pulling means, it acts against the force of the pressure element so that any possible force from the aircraft fuselage on the front floor segment acts in the same force direction on the front floor segment as also on the pulling means. The front floor segment can thus be traveled with the pulling means and an associated drive means in operative connection with the pulling means such that a permanent force action on the front floor segment takes place from the one or preferably plurality of pressure elements. If the front floor segment is to be retracted again, the pulling means is retracted by the drive means so that the pulling force of the pulling means acts against the pressure element and equally retracts the pressure element itself.

The coupling module typically has a folding canopy by which the swivel floor and/or the front floor segment can be covered. The folding canopy is arranged at the coupling module. On a pivoting of the swivel floor, the folding canopy can be designed such that no gaps arise at the side on a pivoting of the swivel floor. For this purpose, the folding canopy can be downwardly lengthened in the lower end region and can extend up to and below the lower edge of the swivel floor and/or of the front floor segment. The folding canopy can optionally be retracted and extended at least sectionally together with the front floor segment. Alternatively or accumulatively, the folding canopy can have longer folds or corrugations in the region of the front floor segment than in the region of the swivel floor so that it can follow the movement of the front floor segment.

In accordance with an embodiment, a front region of the folding canopy can extend with the front floor segment in the direction of the aircraft fuselage. Side openings are thus avoided and a contact frame of the folding canopy can substantially fully contact the aircraft fuselage even when the front floor segment is extended and the folding canopy also extends at least in the front region.

The coupling module can be designed such that the swivel floor with the front floor segment, the base body, the bumper, the pressure element, the pulling means, the drive means, and/or the folding canopy forms a preconfigurable assembly that can be arranged at the cabin. The arrangement in particular takes place here with the above-described pivotability about the pivot axis that projects approximately horizontally from the coupling module and is aligned extending toward an aircraft parkable in front of the coupling module.

The invention is further directed to an air passenger bridge or staircase having a coupling module in accordance with the above description.

Advantageous further developments result from the description, and the drawings. The advantages named in the description of features and of combinations of a plurality of features are only exemplary and can come into effect alternatively or cumulatively without the advantages necessarily having to be achieved by embodiments in accordance with the invention. The features named in the description are to be understood with respect to their number such that exactly this number or a larger number than said number is present without this requiring an explicit use of the term "at least". If therefore, for example, a front floor segment is spoken of, it is to be understood such that exactly one front floor segment, two front floor segments, or a plurality of front floor segments is/are present. These features can be supplemented by other features or can be the only features the respective product consists of.

BRIEF DESCRIPTION OF THE DRAWINGS

Further measures improving the invention will be shown in more detail below together with the description of a preferred embodiment of the invention with reference to the Figures.

DETAILED DESCRIPTION OF THE INVENTION

Figure 1:
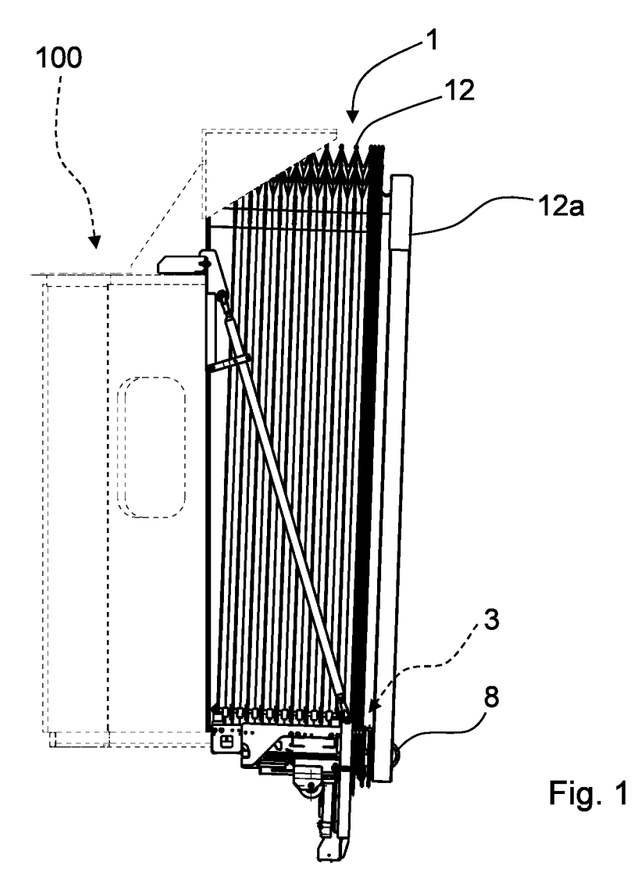
FIG. 1 is a lateral view of the coupling module with a retracted front floor segment.

FIG. 1 shows a lateral view of the coupling module 1 in an arrangement at an air passenger bridge 100 that can, for example, be attached to the building side in an articulated manner and that can be vertically travelable or the air passenger bridge 100 alternatively forms an air passenger staircase that can likewise comprise the coupling module 1. A folding canopy 12 that covers a swivel floor 3 present at the inner side is shown in the side view. A bumper 8 by which the coupling module 1 can move into contact with the fuselage of the aircraft at the outer side is arranged at the front side at the swivel floor and is partially visible in the side view. The folding canopy 12 has a contact frame 12a that is flexible and that can lie on the curved aircraft fuselage at the outer side.

Figure 2:
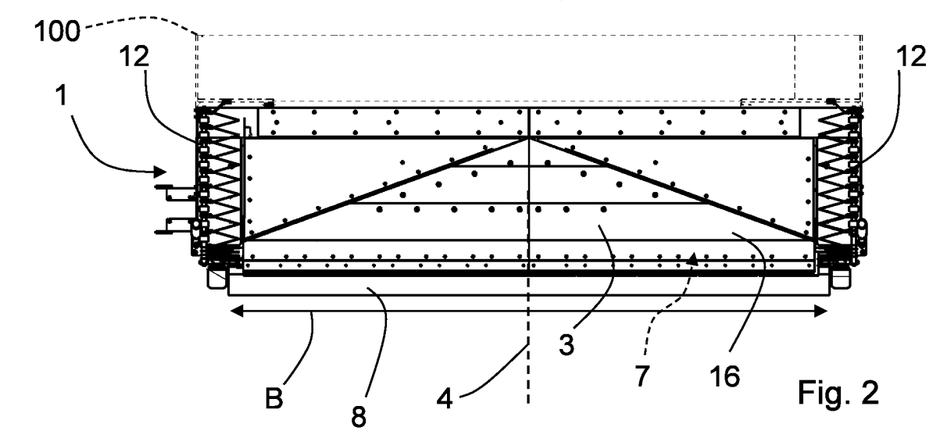
FIG. 2 is a plan view of the swivel floor with a retracted front floor segment.

FIG. 2 shows a plan view of the swivel floor 3, with the folding canopy 12 being shown sectioned. Due to the retracted state of the front floor segment 7, it is not directly visible, but the front floor segment 7 is rather traveled beneath the walkable surface of a base body 16 of the swivel floor 3.

The swivel floor 3 is pivotable about a pivot axis 4 that, as the illustration shows, is perpendicular to the transverse extent of the swivel floor 3 extending in the width B. The coupling module 1 is here located at the front side at the air passenger bridge 100.

Figure 3:
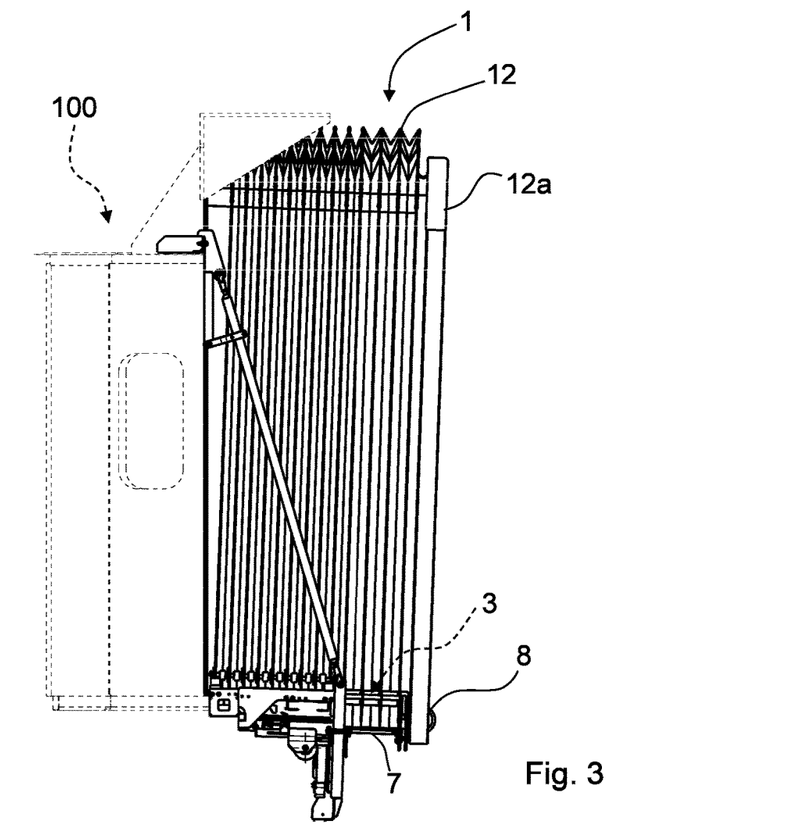
FIG. 3 is a lateral view of the coupling module with an extended front floor segment.

FIG. 3 shows the side view of the coupling module 1 in an arrangement at the air passenger bridge 100 starting from FIG. 1, with the front floor segment 7 differing therefrom being shown in the extended state so that with the front floor segment 7 the depth of the swivel floor 3 is lengthened to the front in the direction toward the bumper 8. The front part of the folding canopy 12 is also extended here, as a comparison of the side view of FIG. 3 with the side view of FIG. 1 shows. If the bumper 8 has been traveled toward the outer side of the aircraft, the contact frame 12a can subsequently be traveled to the outer side of the aircraft.

Figure 4:
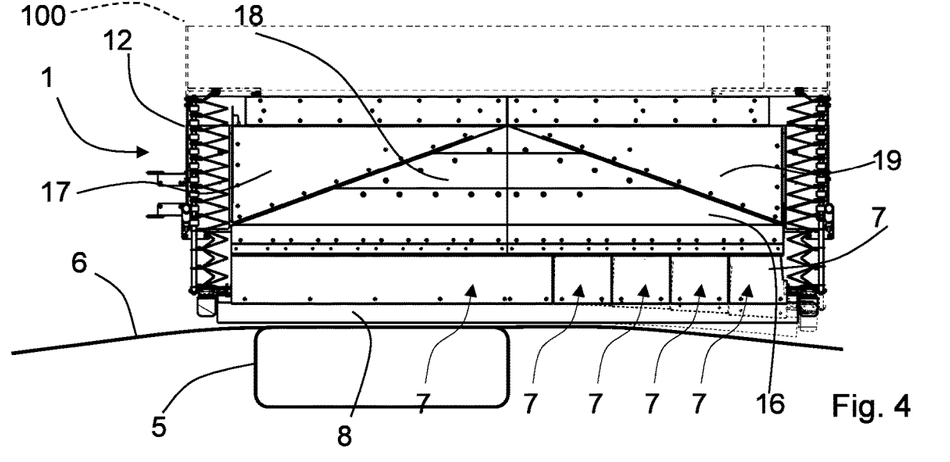
FIG. 4 is a plan view of the swivel floor with an extended front floor segment.

FIG. 4 shows a plan view of the swivel floor 3 with the front floor segment 7 extended at the front side. The swivel floor 3 is here lengthened in the direction toward the aircraft fuselage 6, with the lengthening approximately having a dimension of 100 mm to 400 mm and preferably of 250 mm to 350 mm. The extension length of the front floor segment 7 can differ. The front floor segment 7 is extended further on the right side in the plane of the drawing than on the left side to adapt the front edge to the curvature of the fuselage of the aircraft in the region of the bumper 8. The different extension length of the front floor segment 7 is to this extent also carried out by the folding canopy 8 so that the contact frame 12a also has extension widths of different amounts. The front floor segment 7 can be single-part or multipart so that a plurality of front floor segments 7 can also extend by different amounts in accordance with the illustration.

It is further shown in FIG. 4 that the base body 16 can be divided into three sections 17 to 19 that are substantially triangular in the embodiment shown. The sections 17 to 19 are each pivotably connected to one another at their respective connection lines so that the orientation of the sections 17 to 19 can respectively change on a swivel movement.

Figure 5:
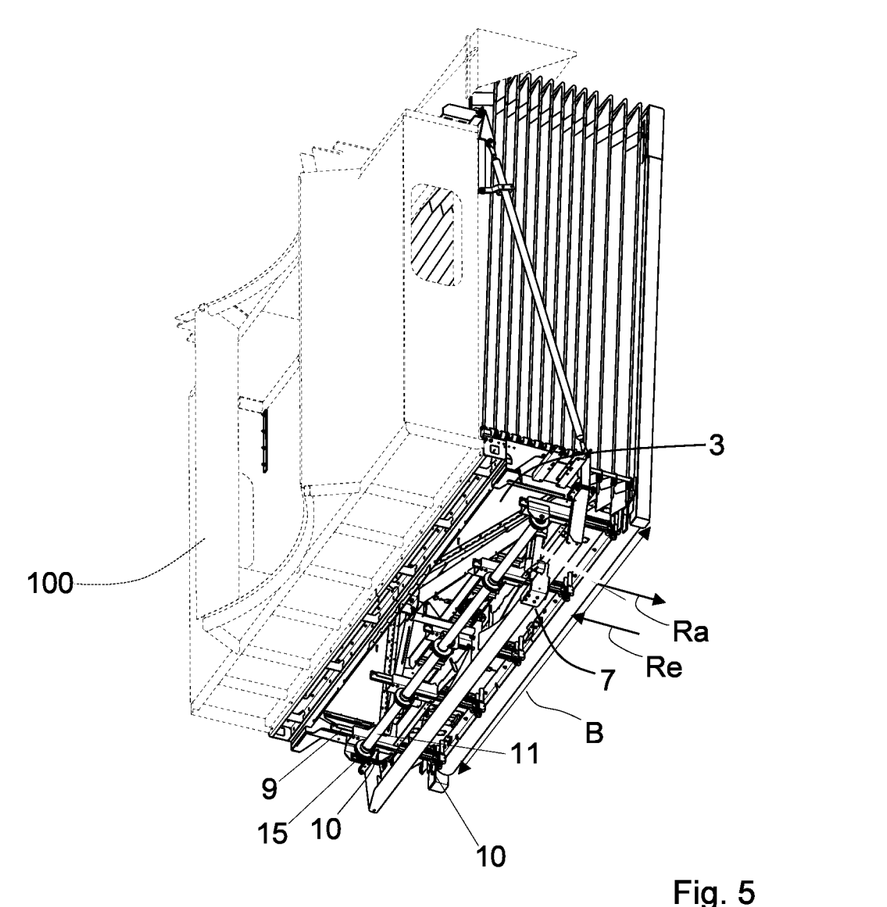
FIG. 5 is a perspective view of the coupling module from a lower side.

A perspective view of the coupling module 1 in an arrangement at the air passenger bridge 100 is shown in FIG. 5, with the view showing the swivel floor 3 from the lower side. The movement and drive mechanism configured to extend the front floor segment 7 becomes visible here. The front floor segment 7 is preloaded in an extending direction Ra by a plurality of pressure elements 9 in the form of gas springs that are arranged distributed over the width of the front floor segment 7 at approximately the same spacing from one another. In this respect, the front floor segment 7 can be divided into different sections that can also be extended in an extending direction Ra individually and independently of one another by the pressure elements 9.

Figure 6:
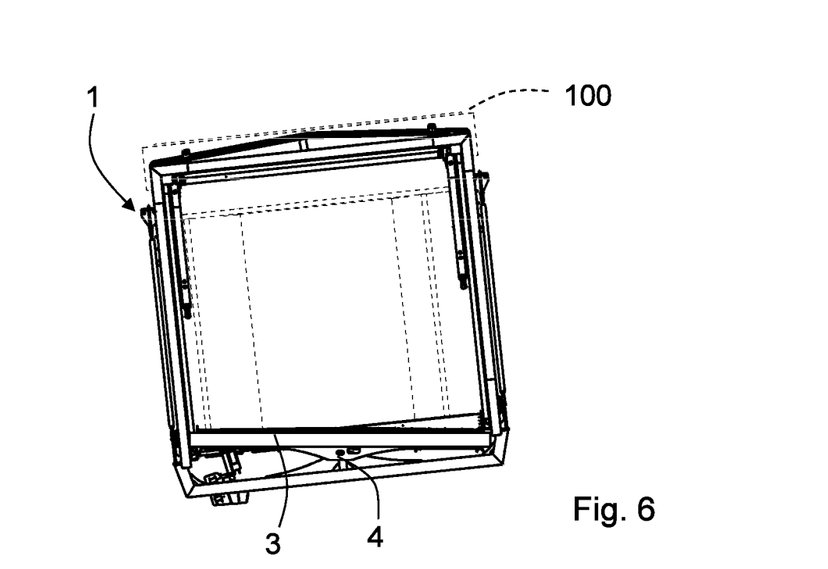
FIG. 6 is a view of the coupling module with a swivel movement to the left that is necessary for smaller aircraft modules.

The pressure elements 9 urge the at least one front floor segment 7 into the extending direction Ra and tension means 10 that are connected to one or respective drive means 11 are provided as counter-movement means. The one or more drive means 11 are configured in accordance with the embodiment as tubular motors that are operatively connected to pulling means disks 15 over which the pulling means 10 is guided. The pressure elements 9 thus preload the at least one front floor segment 7 toward the aircraft fuselage in the extending direction Ra and the front floor segment 7 can be retracted with the pulling means 10 and the associated drive means 11 by a counterforce in the retracting direction Ra. p FIG. 6 shows a front view of the coupling module 1 with a swivel movement of the swivel floor 3 relative to the air passenger bridge 100 to the left for small aircraft models with which the air passenger bridge 100 have to be lowered a lot so that the rotation of the swivel floor 3 about the pivot axis 4 to the obliquely extending air passenger bridge 10 amounts to approximately +6°. The swivel floor 3 is supported at the lower side by a support frame 14 of the air passenger bridge 100.

Figure 7:
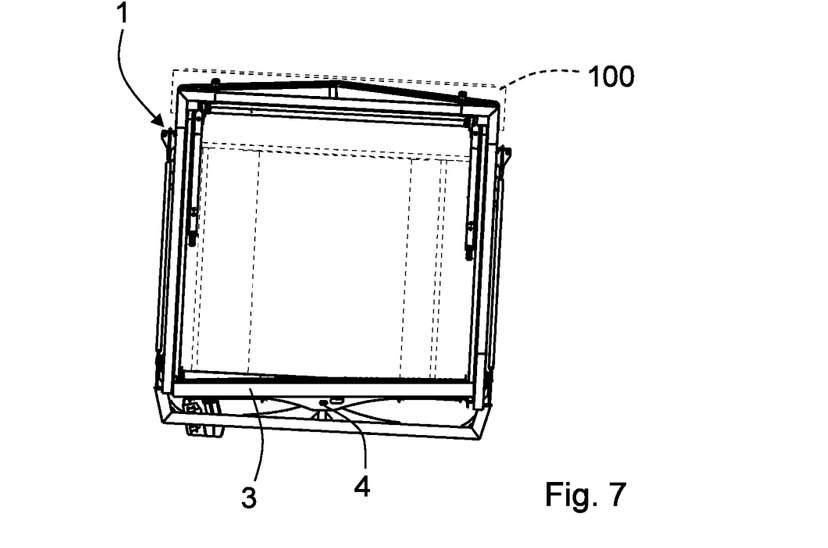
FIG. 7 is a view of the coupling module with a swivel movement of the swivel floor to the right for larger smaller aircraft modules.

FIG. 7 illustrates the coupling module 1 in a front view in which the swivel movement of the swivel floor 3 is carried out, for example, by −3° to the right to perform an adaptation of the swivel floor 3 to larger aircraft. The pivot axis 4 is here located beneath the swivel floor 3 and the swivel floor 3 is supported at the lower side by a support frame 14 of the air passenger bridge 100.

Figure 8:
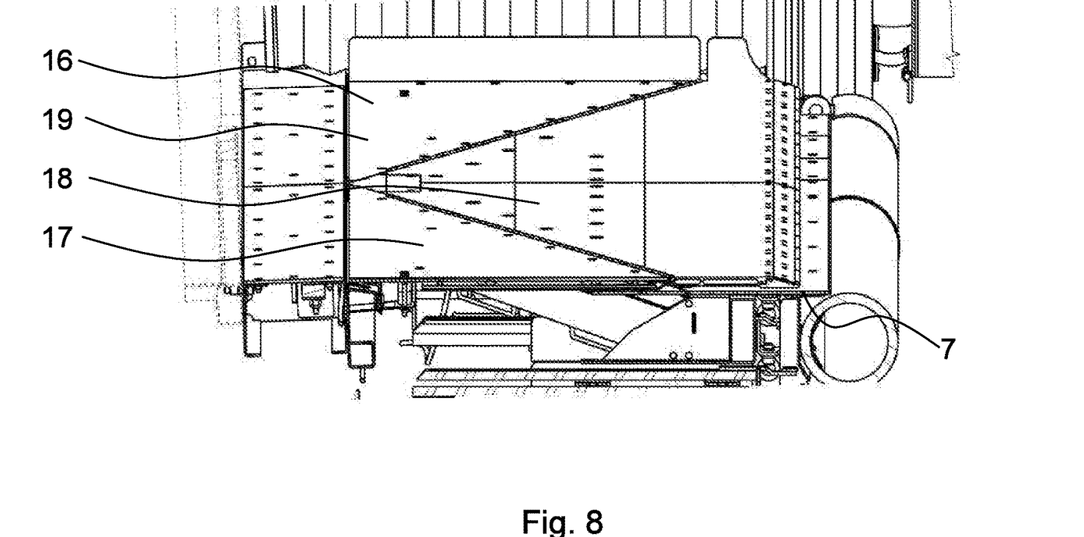
FIG. 8 is a plan view of the swivel floor obliquely from above.
Figure 9:
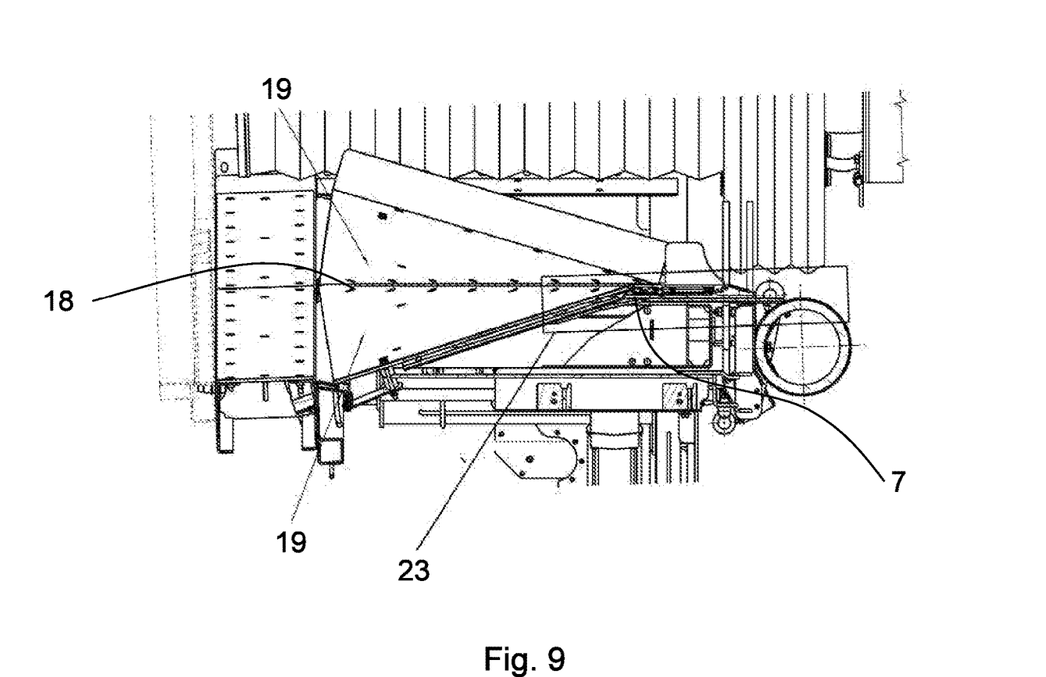
FIG. 9 is a plan view of the swivel floor obliquely from above.

A respective plan view of the pivot floor 3 is shown obliquely from above in FIGS. 8 and 9, with no swivel movement being present in FIG. 8 and the front floor segment 7 being extended, whereas in the illustration in FIG. 9 the swivel floor 3 is shown inclined by approximately 6° and the front floor segment 7 is retracted. Corresponding to the lack of a swivel movement, the sections 17 to 19 of the base body 16 are arranged substantially in one plane in the illustration in FIG. 8, whereby a planar surface results. In the representation in FIG. 9 with an existing inclination, the sections 17 to 19 are each oriented tilted with respect to one another along the respective connection lines.

Figure 10:
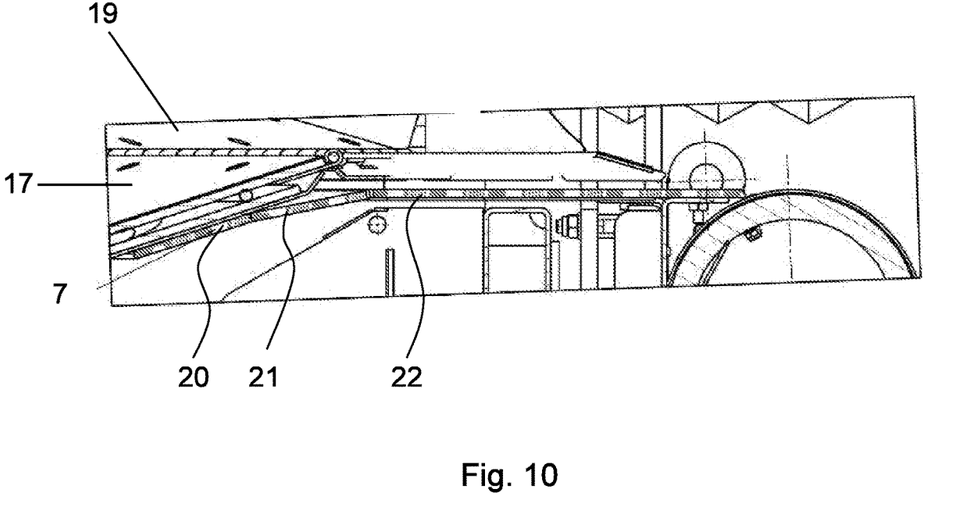
FIG. 10 is a detail of FIG. 9.

Due to the inclination of section 17 of the base body 16 on the swivel movement obliquely downwardly, the front floor segment 7 can only be retracted over a limited depth of the base body 16 in a parallel direction with the base body 16. Since the front floor segment 7 is divided into a plurality of sections 20 to 22 in the direction of retraction that are rotatably connected to one another and are thus variable in their orientation relative to one another, the front floor segment 7 can dip obliquely downwardly beneath the base body 7 on reaching the section 17 oriented obliquely downwardly. For a better illustration, the detail 23 bordered by a rectangle in FIG. 9 is shown enlarged. The individual sections 20 to 22 that are connected to one another along their respective connection lines in a manner rotatable relative to one another can in particular be clearly seen in the detail 23 shown enlarged. The movement guidance takes place here by the lower side of the base body 16. Due to this arrangement and movability of the sections 20 to 22 of the front floor segment 7, a complete retraction of the front floor segment is possible overall despite the swivel movement and the corresponding inclination of the section 17. This applies accordingly to a swivel movement in the other direction.

REFERENCE NUMERAL LIST

1 coupling module
2 cabin
3 swivel floor
4 pivot axis
5 door opening
6 aircraft fuselage
7 front floor segment
8 bumper
9 pressure element
10 pulling means
11 drive unit
12 folding canopy
12a contact floor
13 support arm
14 support frame
15 pulling means disk
16 base body
17 section
18 section
19 section
20 section
21 section
22 section
23 detail
100 passenger bridge
Ra extending direction
Re retracting direction
B width

The invention claimed is:

1. A coupling module for use as an interface between an air passenger bridge or staircase and an aircraft fuselage, comprising:
    a cabin;
    a folding canopy; and
    a walkable swivel floor, at least the swivel floor being pivotably arranged about a pivot axis at the cabin which extends perpendicularly to the transverse extent of the swivel floor to align the swivel floor at a door opening in an aircraft fuselage;
    wherein the swivel floor has at least one front floor segment that is configured as walkable and that is travelable in the direction of the aircraft fuselage with respect to a base body of the swivel floor;
    wherein the swivel floor is covered by the folding cavity; and
    wherein the folding canopy can be retracted and extended at least in portions together with the at least one front floor segment and remains resting on the cabin when the swivel floor is pivoted about the pivot axis.

2. The coupling module according to claim 1, wherein the at least one front floor segment telescopes with respect to the base body.

3. The coupling module according to claim 1, wherein the at least one front floor segment is travelable beneath the base body of the swivel floor and/or into a recess provided in the base body.

4. The coupling module according to claim 1, wherein the at least one front floor segment has a first section and a second section that are flexibly or movably connected to one another and have a first orientation with one another in an extended state and a second orientation with one another that differs from the first orientation in a retracted state, the first section and the second section are arranged perpendicularly to the transverse extent of the swivel floor.

5. The coupling module according to claim 4, wherein the first orientation is an aligned orientation with respect to the pivot axis and the second orientation is an inclined orientation with respect to the pivot axis.

6. The coupling module according to claim 4, further comprising a guide provided for the at least one front floor segment operable to guide an orientation change of the first and second sections on retraction.

7. The coupling module according to claim 6 wherein the guide is formed by the base body.

8. The coupling module according to claim 1, wherein the at least one front floor segment is configured to extend at different extension lengths over its width.

9. The coupling module according to claim 1, further comprising a bumper arranged at a front side at the at least one front floor segment.

10. The coupling module according to claim 1, further comprising at least one pressure element operable to apply force to the at least one front floor segment in an extending direction.

11. The coupling module according to claim 10, wherein:
the pressure element is arranged in a force flow between the base body of the swivel floor and the at least one front floor segment; and/or
the pressure element is a gas spring.

12. The coupling module according to claim 1, further comprising a pulling element arranged at the swivel floor;
wherein the pulling element is operable to apply force to the at least one front floor segment; and/or
wherein the pulling element is a flat belt, a cable, and/or a toothed belt.

13. The coupling module according to claim 12, wherein the pulling element applies force to the front floor segment against a force of a pressure element in a retracting direction.

14. The coupling module according to claim 12, further comprising a drive unit operatively connected with the pulling element.

15. The coupling module according to claim 1, wherein
the folding canopy has longer folds or corrugations in a region of the at least one front floor segment than in the region of the swivel floor.

16. The coupling module according to claim 15, wherein:
the folding canopy, on a pivoting of the swivel floor about the pivot axis, remains stationary at the coupling module, with a lower end region of the folding canopy being guided up to and beneath a walkable upper side of the swivel floor to prevent a gap formation between the folding canopy and the swivel floor on a pivoting of the swivel floor about the pivot axis.

17. The coupling module according to claim 1, wherein the swivel floor with the at least one front floor segment, a bumper, a pressure element, a pulling element, a drive unit, and the folding canopy forms a preconfigurable assembly configured to be arranged at the cabin.

18. The coupling module according to claim 17, further comprising a support arm arranged at the cabin by which the swivel floor and/or the preconfigurable assembly is received pivotably at the cabin.

19. An air passenger bridge or staircase having a coupling module according to claim 1.

* * * * *